(12) United States Patent
Strauss et al.

(10) Patent No.: US 10,935,674 B2
(45) Date of Patent: Mar. 2, 2021

(54) NEUTRINO DETECTOR DEVICE, NEUTRINO DETECTOR SYSTEM AND METHOD OF DETECTING NEUTRINOS

(71) Applicant: Max-Planck-Gesellschaft zur Foerderung der Wissenschaften e. V., Munich (DE)

(72) Inventors: Raimund Strauss, Munich (DE); Johannes Rothe, Karlsfeld (DE); Dieter Hauff, Unterschleissheim (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 0 days.

(21) Appl. No.: 16/604,770

(22) PCT Filed: Apr. 11, 2017

(86) PCT No.: PCT/EP2017/058659
§ 371 (c)(1),
(2) Date: Oct. 11, 2019

(87) PCT Pub. No.: WO2018/188732
PCT Pub. Date: Oct. 18, 2018

(65) Prior Publication Data
US 2020/0379128 A1    Dec. 3, 2020

(51) Int. Cl.
*G01T 1/36* (2006.01)
*G01T 1/16* (2006.01)
*G01T 1/38* (2006.01)

(52) U.S. Cl.
CPC .............. *G01T 1/1606* (2013.01); *G01T 1/38* (2013.01)

(58) Field of Classification Search
CPC ........... G01T 3/00; G01T 7/00; G01T 1/1606; G01T 1/36
See application file for complete search history.

(56) References Cited

U.S. PATENT DOCUMENTS

| 2011/0024616 A1* | 2/2011 | Pringle | H01J 47/02 250/282 |
| 2015/0060686 A1* | 3/2015 | DeVolpi | G21D 1/00 250/390.1 |

FOREIGN PATENT DOCUMENTS

| EP | 0102398 | 3/1984 |
| EP | 1847855 | 10/2007 |

OTHER PUBLICATIONS

International Search Report for corresponding PCT Application No. PCT/EP2017/058659 dated Dec. 12, 2017.
(Continued)

*Primary Examiner* — David P Porta
*Assistant Examiner* — Fani Boosalis
(74) *Attorney, Agent, or Firm* — Caesar Rivise, PC (57) ABSTRACT

A neutrino detector device (100) for detecting neutrinos comprises at least one target detector (10) including a target crystal (11) for creating phonons in response to an interaction of neutrinos to be detected with the target crystal (11) and a target temperature sensor (12) for sensing a temperature change in response to an absorption of phonons created in the target crystal (11), an inner veto detector (20) comprising at least one inner veto component (21) with an inner veto temperature sensor (23), wherein the at least one inner veto component (21) is adapted for supporting the at least one target detector (10) and for an anticoincidence based discrimination of alpha and beta background interaction events by creating phonons in response to the background interaction events and sensing a temperature change in response to an absorption of the phonons with the inner veto
(Continued)

temperature sensor (23), and an outer veto detector (30) for accommodating the inner veto detector (20), wherein the outer veto detector (30) comprises at least one outer veto component (31) creating phonons in response to an interaction with gamma and neutron background and having an outer veto temperature sensor (33) for sensing a temperature change in response to an absorption of phonons created in the at least one outer veto component (31), wherein the neutrino detector device (100) is configured for an operation at cryogenic temperatures, a crystal volume of the target crystal (11) and a size of the target temperature sensor (12) of the at least one target detector (10) are selected such that an over-ground sensitivity threshold of the at least one target detector (10) is below 180 eV, and the at least one inner veto component (21, 26) surrounds the at least one target detector (10), so that the at least one target detector (10) is arranged within the inner veto detector (20). Furthermore, a neutrino detector system including the neutrino detector device and methods of detecting neutrinos are described, wherein the neutrino detector device (100) is used.

31 Claims, 4 Drawing Sheets

(56) References Cited

OTHER PUBLICATIONS

Angloher et al., "Probing Low WIMP Masses With the Next Generation of CRESST Detectors", The CRESST Collaboration, Mar. 27, 2015, retrieved from: https://arxiv.org/pdf/1503.08065.pdf.
Gonzalez-Mestres, "Luminescent Bolometer and Neutrino Physics", Cornell University Library, 201 OLIN Library Cornell University, Nov. 25, 1997.
Strauss et al., "A Prototype Detector for the CRESST-III Low-Mass Dark Matter Search", Nuclear Instruments and Methods in Physics Research, Section A: Accelerators, Spectrometers, Detectors, and Associated Equipment, vol. 845, Jun. 15, 2016, pp. 414-417.
Strauss et al., "The CRESST-III Low-Mass WIMP Detector", Journal of Physics: Conference Series, vol. 718, No. 4, Jun. 9, 2016.
Christensen et al., "Antineutrino Monitoring for Heavy Water Reactors", Physical Review Letters, Jul. 25, 2014.
Drukier et al., "Principles and Applications of a Neutral-Current Detector for Neutrino Physics and Astronomy", Physical Review D, vol. 30, No. 11, Dec. 1, 1984.
Pröbst et al., "Model for Cryogenic Particle Detectors With Superconducting Phase Transition Thermometers", Journal of Low Temperature Physics, vol. 100, Nos. 1/2, 1995.

* cited by examiner

NEUTRINO DETECTOR DEVICE, NEUTRINO DETECTOR SYSTEM AND METHOD OF DETECTING NEUTRINOS

CROSS REFERENCE TO RELATED APPLICATIONS

This United States national phase application claims the benefit under 35 U.S.C. § 371 of PCT Application No. PCT/EP2017/058659 filed on Apr. 11, 2017, the contents of which is incorporated by reference herein.

FIELD OF THE INVENTION

The invention relates to a neutrino detector device for detecting neutrinos on the basis of interactions of neutrinos with heavy nuclei in a target crystal operated at cryogenic temperatures. Furthermore, the invention relates to a neutrino detector system including at least one neutrino detector device and to a method of detecting neutrinos using the neutrino detector device. Applications of the invention are available in investigating neutrinos in particular in above-ground environments, e. g. in monitoring nuclear power plants, research experiments or geological formations.

TECHNICAL BACKGROUND

In the present specification, reference is made to the following related art illustrating the technical background of the invention:
[1] E. Christensen et al. in "Phys. Rev. Lett." vol. 113, 2014, p. 042503;
[2] EP 0 102 398 B1;
[3] A. Drukier et al. in "Phys. Rev. D" vol. 20, 1984, p. 2295;
[4] R. Strauss et al. in "Nuclear Instruments & Methods in Physics Research A" vol. 845, 2017, p. 414-417, 2016; and
[5] F. Probst et al. in "J. Low. Temp. Phys." vol. 100(12), 1995, p. 69-104.

It is generally known that neutrinos react with materials exclusively via the weak interaction, which is one of the four known fundamental interactions of nature. Therefore, neutrinos leave a source isotropic and unaffected by surrounding materials. This makes them an ideal source of information e. g. for the monitoring of nuclear reactions. As an example of monitoring artificial nuclear reactions, antineutrino monitoring for heavy water reactors has been suggested in [1]. However, as neutrinos have no electrical charge and essentially zero mass, detecting neutrinos is challenging.

In basic research, e. g. for investigating neutrino flux from outer space or nuclear reactions in an accelerator, neutrino detectors with a huge target mass of some hundred tons are used. As an example, by the interaction of neutrinos with the target substance, photons are created which are sensed with light sensors. These detectors are operated underground for shielding background radiation, e. g. cosmic radiation. Due to the size and underground operation, this type of neutrino detector is not suitable for monitoring artificial nuclear reactions with time resolution, e. g. in a nuclear power station.

In [2] and [3], a compact neutrino detector has been suggested, which includes a superconducting semiconductor target material. By interactions of neutrinos with the target material, a change in electrical resistivity of the target material is induced, which can be sensed as an indicator of a neutrino interaction event. Although this type of neutrino detector would allow an operation above ground and even a mobile operation, e. g. for investigating a geological source of radioactivity, it would have a substantial disadvantage in terms of limited sensitivity threshold (energy threshold).

Detectors with a low sensitivity threshold are required not only for neutrino detection but also e. g. in dark matter search. The dark matter detector disclosed in [4] comprises a $CaWO_4$ target crystal with a size of 20 mm×20 mm×10 mm and a temperature sensor. The temperature sensor is a transition edge sensor ([5]). In response to an interaction of neutrinos or dark matter particles with the target crystal, phonons are created inducing a measurable temperature change in the temperature sensor. The target crystal is supported by $CaWO_4$ sticks, which are provided with temperatures sensors as well. The $CaWO_4$ sticks are arranged along one single spatial direction relative to the target crystal. The $CaWO_4$ sticks are used for an anticoincidence based discrimination of background interaction events (veto detector). With an operation at cryogenic temperatures, an above ground sensitivity threshold of 190 eV is obtained. Furthermore, a sensitivity threshold of 50 eV is estimated in [4], which would offer a detection of neutrinos. However, this energy threshold would be obtained only for underground operation of the detector disclosed in [4], so that it would not be suitable for above ground neutrino detection.

SUMMARY OF THE INVENTION

The objective of the invention is to provide an improved neutrino detector device and method being capable of avoiding limitations of conventional detector techniques, and in particular providing an improved sensitivity threshold, e. g. allowing neutrino detection above ground and/or providing an improved background suppression. Furthermore, the objective of the invention is to provide an improved neutrino detector system, including at least one neutrino detector device, being capable of avoiding limitations of conventional detector systems, in particular allowing a mobile operation in an environment of investigation.

SUMMARY OF THE INVENTION

These objectives are correspondingly solved by a neutrino detector device, a neutrino detector system and a method of detecting neutrinos, comprising the features of the independent claims, respectively. Preferred embodiments and applications of the invention arise from the dependent claims.

According to a first general aspect of the invention, the above objective is solved by a neutrino detector device comprising at least one target detector, an inner veto detector and an outer veto detector, wherein the at least one target detector is contained in the inner veto detector and the inner veto detector is contained in the outer veto detector. The at least one target detector, the inner veto detector and the outer veto detector are cryogenic detectors, i. e. they are configured for an operation at a cryogenic operation temperature, in particular below 200 mK, e. g. in a range from 5 mK to 100 mK.

Each target detector comprises a target crystal and a target temperature sensor in contact with the target crystal. The target crystal is a single crystal including heavy nuclei (nuclei with a mass number above 50). In response to an interaction of neutrinos to be detected with the target crystal, in particular with the heavy nuclei, phonons are created in the target crystal. The term "neutrino" refers to both of the elementary particle neutrino and its anti-particle, the anti-neutrino. The interaction events include coherent neutrino-nucleus scattering (CNNS) being described with the standard model of physics and being investigated experimentally in basic research experiments already. Preferably, one target temperature sensor is provided on one target crystal. The target temperature sensor is capable of absorbing the phonons created in the target crystal, wherein the absorbed phonons induce a temperature change, which is detected by an electrical resistance measurement. Output signals of the target detector represent the occurrence of neutrino interaction events and possible background events which are suppressed using the inner and outer veto detectors.

The target crystal has a crystal volume and the target temperature sensor has a sensor size matched to the crystal volume. According to the invention, the crystal volume and the sensor size are selected such that an over-ground sensitivity threshold of the at least one target detector is below 180 eV, preferably below 100 eV, particularly preferred below 50 eV. The selected crystal volume is a target crystal size, where a phonon density is sufficiently large and simultaneously sufficient mass of heavy nuclei for neutrino interaction events is presented, so that the sensitivity threshold is obtained, when the target crystal is enclosed by the inner and outer veto detectors. The target crystal size can be estimated e. g. by practical tests or numerical calculations, in dependency on the energy and flux of the neutrinos to be detected. Compared with conventional detectors, e. g. according to [4], the improved sensitivity threshold is obtained by reducing the crystal volume. Additionally, the sensor size, which is a geometric feature of the target temperature sensor, is selected in dependency of the crystal volume. Depending on the crystal volume, the phonons generated in the target crystal have a specific life time. The sensor size, in particular the area of a phonon absorbing section of the target temperature sensor, is selected such that the life time of the photons is not or negligibly influenced by the target temperature sensor.

The inner veto detector (or: inner anticoincidence detector) is adapted for detecting background events, in particular beta and alpha radiation, and/or light optionally created by the target crystal. The inner veto detector comprises at least one inner veto component, each provided with an inner veto temperature sensor. Background events create phonons in the at least one inner veto component resulting in a temperature change of the inner veto temperature sensor, which is detected by an electrical resistance measurement. Output signals of the inner veto detector can be compared with the output signals of the target detector, thus providing an anticoincidence background suppression. Signal components being simultaneously included in the target and inner veto output signals are discarded as background signals.

Furthermore, according to the invention, the at least one inner veto component has a shape surrounding the at least one target detector, so that the at least one target detector is arranged within the inner veto detector. The term "surrounding" the at least one target detector indicates that the at least one inner veto component is arranged adjacent to the at least one target detector along at least two different spatial directions. The at least one target detector is supported by the at least one inner veto component, which provides a target detector holder (or: instrumented holder). Preferably, the at least one inner veto component of the inner veto detector comprises a single crystal wafer, like e. g. a silicon or sapphire wafer. With further preferred embodiments the at least one inner veto component is a plane plate with a thickness in a range from 10 μm to 1 mm.

According to the invention, the outer veto detector (or: outer anticoincidence detector) is provided for detecting further background events, in particular gamma and neutron radiation. It comprises at least one outer veto component (or: outer veto container component), each having an outer veto temperature sensor. Again, background events create phonons in the at least one outer veto component resulting in a temperature change of the outer veto temperature sensor, which is detected by a further electrical resistance measurement. Output signals of the outer veto detector are compared with the output signals of the target detector and the inner veto detector, thus providing an anticoincidence background suppression. Signal components being simultaneously included in the target and inner and/or outer veto output signals are discarded as background signals. Furthermore, the outer veto detector surrounds the inner veto detector, preferably along all spatial directions. The at least one, preferably at least two, outer veto component(s) shape(s) a container including the inner veto detector. Preferably, the at least one outer veto component is made of single crystal material, like e. g. Ge or $CaWO_4$.

Preferably, the inner and/or outer veto detectors can be segmented, i.e. they can comprise multiple inner and/or outer veto components, resp. Segmenting the inner and/or outer veto detectors may have advantages for adapting the size and shape of the inner and/or outer veto components to the size of the at least one target detector and/or for manufacturing the inner and/or outer veto components.

Advantageously, reducing the size of the target crystal compared with conventional techniques provides the following advantages, which in combination allows the detection of coherent neutrino-nucleus scattering in the target crystal. Firstly, an improved sensitivity threshold is obtained. Secondly, arranging the at least one target detector within the inner and outer veto detectors is facilitated so that the background suppression is substantially improved. Thirdly, the absolute rate of detecting neutrino scattering events is limited to a total rate (neutrinos pulse background events) below 0.5 Hz, in particular 0.1 Hz. As the output signal of the target temperature sensor representing a scatter event has a duration of about 10 ms to 100 ms, the size of the target crystal preferably is selected such that the absolute rate of detecting neutrino scattering events is below 0.5 Hz, in particular 0.1 Hz. Thus, the inventive structure with three nested detectors allows a neutrino detection above ground. The advantages of neutrino detection with improved precision and reproducibility are obtained, while simultaneously a compact design is provided. With the compact design, new applications are available, like the monitoring of nuclear power stations.

According to a second general aspect of the invention, the above objective is solved by a neutrino detector system, comprising at least one neutrino detector device according to the above first general aspect of the invention and operation equipment being adapted for running the at least one neutrino detector device. The operation equipment comprises a cooling device being for cooling the at least one neutrino detector device to the cryogenic operation temperature, a vacuum device for evacuating the at least one neutrino detector device, in particular a vacuum chamber accommodating the target, inner veto and outer veto detectors, and a control device being coupled with the target temperature sensor(s) of each target detector, the inner veto temperature sensor(s) of each inner veto detector component and the outer veto temperature sensor(s) of each outer veto container component. Preferably, the cooling device comprises a cryostat, like a dilution cryostat, being commercially available. The control device preferably receives the output signals from the sensors and conducts an analysis thereof, including background discrimination and identifying neutrino scatter events.

Due to the compact size of the neutrino detector device and the capability of above ground operation thereof as well as the availability of compact cooling and vacuum devices, the neutrino detector system has particular advantages in terms of flexible and new applications for monitoring environments to be investigated.

According to a third general aspect of the invention, the above objective is solved by a method of detecting neutrinos, wherein at least one neutrino detector device according to the above first general aspect of the invention and/or at least one neutrino detector system according to the above second general aspect of the invention is used in an environment to be investigated. The method of detecting neutrinos includes the steps of collecting time series of sensor output signals from each target temperature sensor, inner veto temperature sensor and outer veto temperature sensor and analyzing the collected output signals for identifying neutrino scatter events in the at least one target detector.

According to a preferred embodiment of the invention, the target crystal of the at least one target detector has a cube shape, which has advantages in terms of a maximum volume—surface ratio of a cuboid body. Preferably, the target crystal has an edge length below 10 mm, in particular below 6 mm, and/or above 1 mm, in particular above 3 mm. Alternatively, a cuboid shape of the target crystal can be used.

If, according to a further preferred embodiment, the temperature sensors of at least one of the detectors, in particular the target temperature sensor each target detector is a transition edge sensor (TES), advantages for reducing the sensitivity threshold are obtained. The TES includes a phonon absorbing film, e. g. made of W, deposited on the surface of the target crystal. By adjusting the detector temperature, the TES is operated in the transition between the superconducting and normal conducting state of the phonon absorbing film, thus providing a large resistivity change in response to temperature changes. Alternatively or additionally, the temperature sensors of at least one of the detectors may comprise NTD detectors.

The inventive neutrino detector device can include one single target detector only, thus minimizing the size of the device structure in an advantageous manner. With the single target detector, practical measurement results of e. g. 10 neutrino scatter events can be detected per day at a thermal nuclear reactor with thermal power of 5 GW and a distance in a range of about 10 m to 15 m. According to an alternative, preferred design, an array of multiple target detectors (or: detector array) is provided within the inner veto detector. This embodiment of the invention provides advantages for increasing the probability of detecting neutrinos by increasing the sensitive detector volume. The measurement time for monitoring an environment of investigation can be reduced compared with the use of a single target crystal. The array of multiple target detectors preferably comprises at least two target detectors arranged side by side but separated from each other and commonly held by the inner veto detector. Particularly preferred, the array of target detectors comprises at least one plane matrix arrangement of target detectors.

As a further advantage of the invention, all target crystals of the detector array can be made from a common wafer component. Advantageously, all target crystals consist of the same material. The target temperature sensors can be provided on the wafer simultaneously with a common thin film deposition process. All target temperature sensors can be provided with identical thermal and electrical properties (in particular heat capacity, thermal conductivity, thermal coupling with outer heat sink, electrical resistance), thus increasing the reproducibility of phonon sensing. This advantage is obtained even with large numbers of target crystals, e. g. at least 9 or even at least 100 per array.

According to a further preferred embodiment, at least one reference target detector can be arranged within the inner veto detector. The reference target detector includes at least one reference target crystal, which has a different composition compared with the target crystal. The composition of the reference target crystal is selected for creating phonons in response to background interaction events. Each reference target crystal is provided with a reference target temperature sensor, which is arranged for sensing a temperature change in response to an absorption of phonons created in the reference target crystal. Advantageously, the reference target detector provides a statistical characterization of the background. In particular, the at least one reference target detector provides an information on an energy distribution of the neutron background, which can be used in an estimation of a rate of the neutrino signal, thus increasing the significance of neutrino detection. Alternatively, the energy spectra of the at least one reference target detector simply can be subtracted from the energy spectra of the at least one target detector.

Preferably, both of the target crystal and the reference target crystal are made of different crystal materials, like $CaWO_4$ and sapphire, $Al_2O_3$, but both include light nuclei (nuclei with a mass number equal to or below 50), provided e. g. by oxygen atoms within the crystal lattice of both crystal types. Advantageously, the light nuclei scatter neutrons and/or gamma photons. By comparing the output signals of the target detector and the reference target detector in particular neutron and/or gamma scatter signals can be additionally suppressed.

Particularly preferred, an array of multiple reference target detectors can be provided within the inner veto detector, in particular in combination with an array of target detectors. Preferably, the array of reference target detectors has the same size and geometric configuration like the array of target detectors.

According to a particularly preferred embodiment of the invention, the at least one inner veto component of the inner veto detector is configured such that it surrounds the at least one target detector along all spatial directions. The at least one target detector (and optionally the at least one reference detector) is completely enclosed by the at least one inner veto component. If one single inner veto component is provided, it forms a container accommodating the at least one target crystal. If multiple inner veto components are provided, they are arranged such that any straight line (line of sight) from any location in each target crystal towards the surrounding crosses one inner veto component. Advantageously, the complete enclosure provides a maximum background suppression by the inner veto detector.

Advantages for fulfilling the double function of holding the target detector and anticoincidence background suppression are obtained if at least two plate or slab shaped inner veto components (or: inner veto holding components) of the inner veto detector are arranged on opposite sides of the at least one target detector. The inner veto holding components have protruding first support elements with exposed ends which contact the target crystal(s) of the target detector. Preferably, the first support elements are integrally formed with the inner veto holding components. The inner veto holding components, in particular the first support elements, clamp the at least one target detector therebetween. Preferably, at least one of the plate shaped inner veto components is a flexible wafer, providing an elastically deformable spring even at cryogenic temperatures. The elastically deformable wafer absorbs mechanical stress possibly occurring at changing temperatures.

Furthermore, additionally to the at least one inner veto component, the inner veto detector can include at least one passive support component being adapted for supporting the at least one inner veto component via second support elements. The second support elements are further protruding structures contacting the at least one inner veto component.

Advantageously, the first and/or second support elements provide contact surfaces, where the supported components are mechanically contacted, which are smaller than the extension of the components, so that the thermal coupling is reduced. Preferably, the contact surfaces of the first support elements are sized such that the thermal coupling between each target crystal and the inner veto components is negligible compared with thermal coupling from the target crystal via the target temperature sensor to the surrounding heat bath (surrounding parts of the neutrino detector device). Furthermore, the contact surfaces of the second support elements are sized such that the thermal coupling between each supported inner veto component and the passive support components is negligible compared with thermal coupling from the at least one supported inner veto component via the inner veto temperature sensor to the surrounding heat bath. Particularly preferred, the first and second support elements provide point-like contact surfaces.

Optionally, the inner veto detector can be adapted for detecting photons via light absorption, phonon creation and phonon detection with the inner veto temperature sensor(s). In this case, advantages for further background suppression are obtained. Preferably, the target crystal of the at least one target detector is adapted for creating the photons in response to background interaction events in the target crystal. The photons are detected by the inner veto detector surrounding the target crystal. Output signals of the target temperature sensor(s) and the inner veto temperature sensor(s) can be used for further anticoincidence background suppression.

Advantageously, all inner veto components can be made from identical wafer components, and preferably all inner veto components consist of the same material. The inner veto temperature sensors can be provided on the wafer simultaneously with a common thin film deposition process. Like the target temperature sensors, the inner veto temperature sensors can be provided with identical thermal and electrical properties, thus increasing the reproducibility of phonon sensing. Thus, using the available processes of semiconductor processing, the complexity of manufacturing the inner veto detector does not depend on the number of inner veto components.

Advantageously, the inventive neutrino detector device is robust against background, allowing an above-ground application of the neutrino detector system. The entire neutrino detector system (including infrastructure) needs only small space. Thus, it can be arranged in a stationary container, e. g. in or outside a building or on a mobile carrier device, like e.g., a minibus, transporter, movable container.

According to a particularly preferred embodiment of the invention, the neutrino detector system includes a generator device being arranged for power supply and operating the neutrino detector system independently of a stationary power network. Thus, with the neutrino detector system including the generator device on the mobile carrier device, the neutrino detector system can be moved relative to a target site (neutrino source) in the environment to be investigated.

According to a preferred application of the invention, the target site in the environment to be investigated is a nuclear power station. At least one inventive neutrino detector system can be arranged at a distance from the nuclear power station of e. g. up to 100 m or even more, e. g. up to 500 m. Advantageously, it is not necessary to enter the terrain of the nuclear power station.

The nuclear power station can be monitored as a function of time. As the neutrino flux depends on the operational power of the nuclear power station, operational phases thereof can be identified, e. g. including regular operation phases for power generation or frequent shut down for diversion of fissionable material for plutonium enrichment.

With the inventive neutrino detector system energy spectra of the neutrinos can be measured, providing information on the composition of the fissionable material. In this case, single monitoring actions are sufficient and a continuous monitoring can be omitted.

According to a further preferred embodiment of the detection method the inventive neutrino detector system can be positioned at different detection positions having different distances from the target site in the environment to be investigated. Collecting the sensor output signals at the different detection positions and analysing the collected sensor signals allows further characterization of background conditions by analysing differences of the collected sensor signals at the different detection positions.

In summary, the invention provides a neutrino detector, which is sensitive to coherent neutrino-nucleus scattering (CNNS), facing two main challenges: an extremely low energy threshold combined with extraordinarily small background levels. The inventive detector combines the possibility of lowest nuclear-recoil thresholds ($\leq 10$ eV) reachable with cryogenic detectors and the advantages of a fiducial volume device. The inner and outer veto detectors provide active shielding of the outermost regions against external radiation which reduces the background level in the innermost target volume (the fiducial volume). Since an exact spatial position reconstruction of events is difficult to realize in thermal detectors, so far this potential could not be exploited. Here, a cryogenic detector is presented which realizes a fiducial volume by combining three 3 individual detectors (calorimeters): 1) the target detector (fiducial volume) with an extremely low threshold of ($\leq 10$ eV), 2) the inner veto detector, preferably as a $4\pi$ veto, e. g. against surface beta and alpha decays, and 3) the massive outer veto detector, e.g. against external gamma/neutron radiation. Additionally, the inner veto detector acts as an instrumented holder for the target crystal to discriminate holder-related events (e.g. from stress relaxations).

BRIEF DESCRIPTION OF THE DRAWINGS

Further details and advantages of the invention are described in the following with reference to the attached drawings, which show in.

PREFERRED EMBODIMENTS OF THE INVENTION

Features of preferred embodiments of the invention are described in the following with reference to details of the neutrino detector device, in particular the structure and arrangement of the detectors thereof. Features of the neutrino detector system including the neutrino detector device, like e. g. details of cooling and vacuum equipment, are not described as they are known as such from prior art. Exemplary reference will be made in the following to a neutrino detector system for monitoring a nuclear power plant. The invention is not restricted to this application, but can be used also for monitoring other sources of neutrinos of artificial or natural origin, e. g. in laboratory experiments or others tests or at geological sites including radioactive geological formations or in astro-particle detection. Exemplary reference will be made in the following to a neutrino detector system including $CaWO_4$ based target detectors. The invention is not restricted to this material, but can be implemented with other crystals including heavy nuclei, in particular W or Mo, like e. g. $PbWO_4$, $ZnWO_4$, CsI, $CdWO_4$, $CaMoO_4$, $CdMoO_4$ or $ZnMoO_4$.

Figure 1:
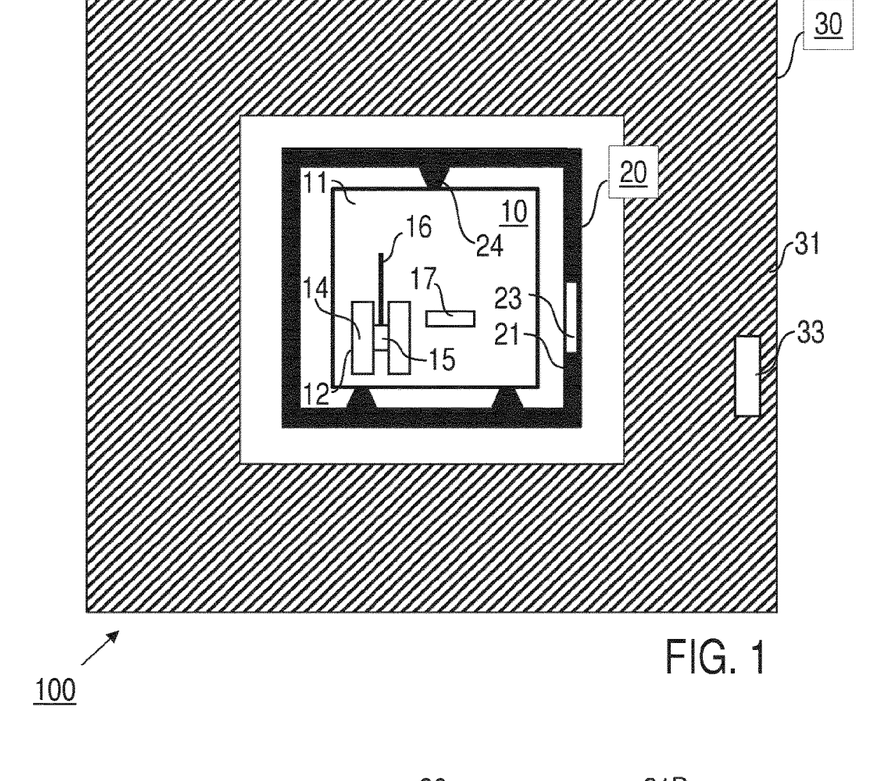
FIG. 1: a schematic cross-sectional view of a preferred embodiment of the inventive neutrino detector device.

FIG. 1 shows a schematic view of the inventive neutrino detector device 100, which comprises three individual cryogenic detectors 10, 20 and 30, each being operated as a calorimeter. The combination of the inner target detector 10 with both, the inner veto detector 20 detecting surface alpha and beta decays and the outer veto detector 30 detecting neutrons and gamma photons, significantly reduces the background level in the target detector 10. In this way, a fiducial-volume cryogenic detector is realized. The inner veto detector 20 acts additionally as instrumented holder of the target detector 10 to reject possible stress-related relaxation events.

Figure 2:
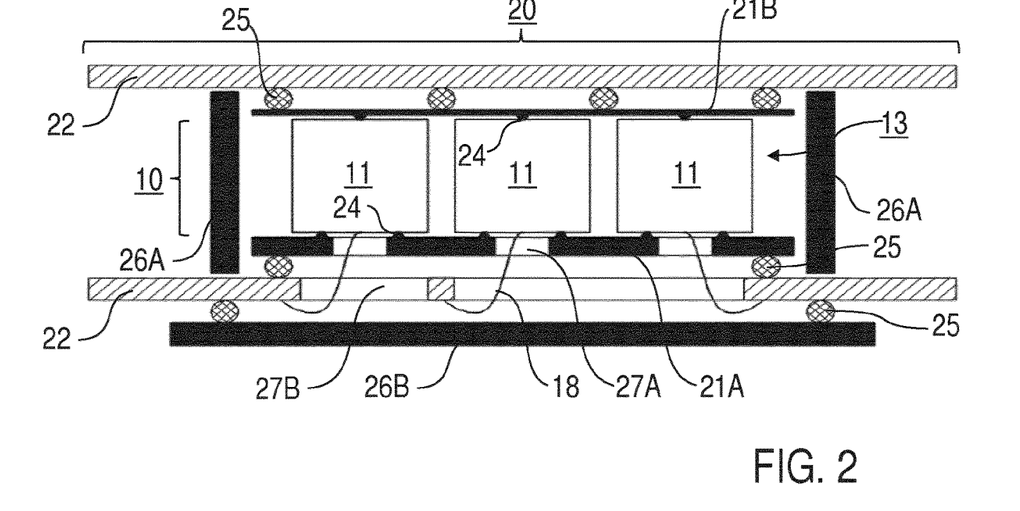
FIG. 2: a cross-sectional view of the target and inner veto detectors of an inventive neutrino detector device.
Figure 3:
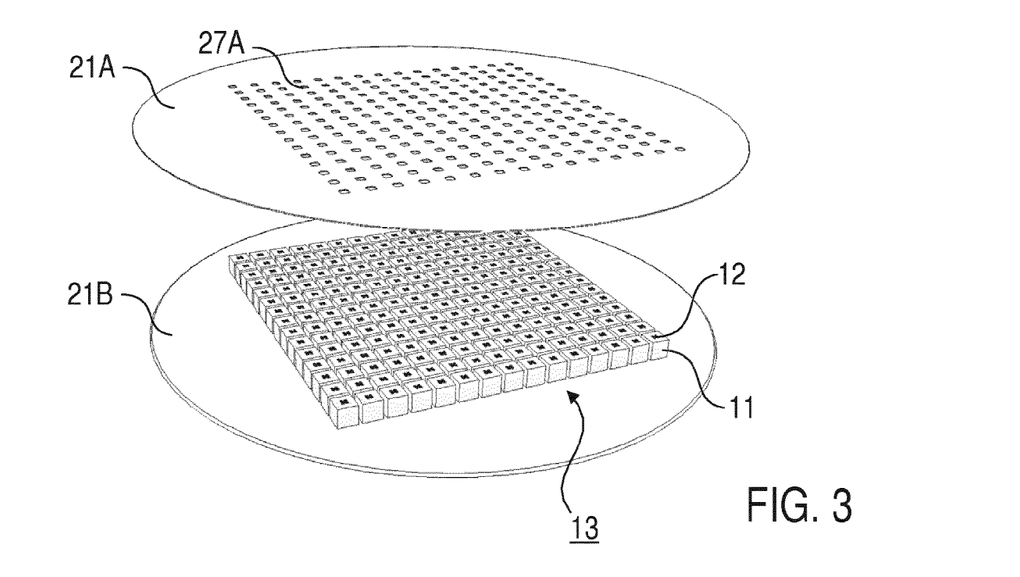
FIG. 3: a schematic perspective view of an enlarged array of target detectors.
Figure 4:
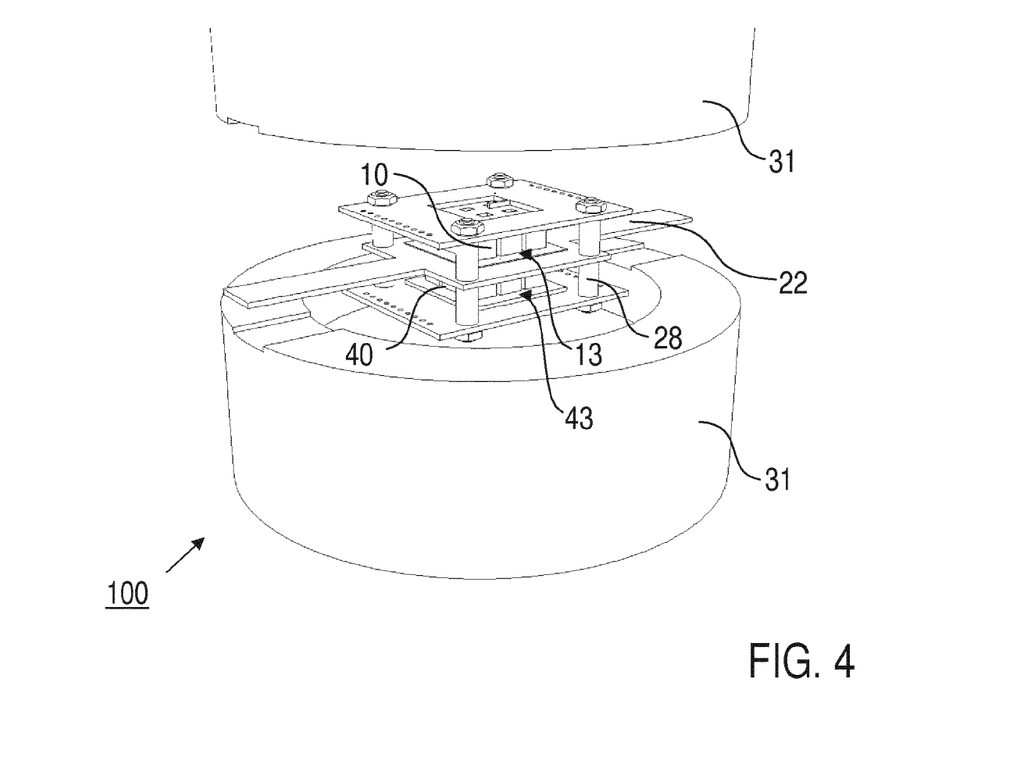
FIG. 4: a schematic perspective view of further details of an embodiment of the inventive neutrino detector device.

The target detector 10 comprises one single target crystal 11 provided with a target temperature sensor 12 (FIG. 1) or an array 13 of multiple target crystals 11 (FIGS. 2, 3, 4). The target crystal 11 is a cubic crystal with an edge length of e. g. 5 mm. It consists of single crystal $CaWO_4$ (mass e. g. 0.76 g), including W as heavy nuclei.

The target temperature sensor 12 is a TES deposited on one surface of the target crystal 11, e. g. as known from [4]. It includes phonon collector films 14 (made of Al, thickness e. g. 1 μm, area e. g. 0.15 mm$^2$) and a sensor film 15 (made of W, thickness e. g. 200 nm, area e. g. 0.0061 mm$^2$). The phonon collector films 14 increase the collection area for phonons without the penalty of increasing the heat capacity of the sensor [4] yielding an increased output pulse height. The target temperature sensor 12 is weakly coupled to the surrounding heat bath (heat sink) via a stripe 16 (made of Au, size e. g. 0.01×7.0 mm$^2$, thickness: 20 nm). The stripe is connected via an Au wire bond to one of the passive support components of the inner veto detector 20 described below, and provides a thermal conductance of about 10 pW/K (at a temperature of 10 mK). Wire bonds (made of Al) with a diameter of e. g. 25 μm are used to provide the electrical contacts for the target temperature sensor 12 (bonded on the phonon collectors) as well as an ohmic heater 17 (separate bond pads), respectively. Typically, bias currents between 100 nA and 50 μA are applied on the target temperature sensor 12. The resistance change of the target temperature sensor 12 can be measured with a SQUID (superconducting quantum interference device) system, as e. g. described in [4].

A performance model prepared by the inventors predicts an energy threshold of the target detector 10 of about 6.5 eV for the $CaWO_4$ target crystal. To obtain a more efficient total target mass, a 3×3 detector array 13 can be foreseen as shown in FIGS. 2 and 4. This corresponds to a total target mass of 6.84 g for the $CaWO_4$.

The inner veto detector 20 comprises inner veto component(s) 21 enclosing the target detector 10 and providing an active discrimination against beta and alpha decays on surfaces surrounding the volume of target crystal 11. Typical Q-values of such decays are between about 10 keV and 10 MeV typically shared between 2, 3 or more product particles. In a configuration where the target crystal 11 is surrounded by a 4π active veto, the total energy of the reaction is detected (minus the energy transferred to neutrinos in beta decays). In this way, a high fraction of such backgrounds can be rejected by coincident events in the inner veto detector 20. The rejection of surface background is crucial in particular when approaching ultralow energy thresholds.

The inner veto component(s) 21 comprise e. g. wafers of single crystal Si with a thickness of e. g. 400 μm. Each inner veto component 21 has an inner veto temperature sensor 23, which is provided on a surface of the respective inner veto component 21. Preferably, the inner veto temperature sensor 23 is structured like the target temperature sensor 12 described above, but having a size adapted to the size of the respective inner veto component 21. In particular, the inner veto temperature sensor 23 is weakly coupled to the surrounding heat bath (heat sink) via a stripe being wire bond to one of the passive support components of the inner veto detector 20. The inner veto component(s) 21 support the target detector 10 via first support elements 24 and the inner veto component(s) 21 are supported by passive support component via second support elements (not shown in FIG. 1), as described below with reference to FIG. 2.

The outer veto detector 30 comprises outer veto component(s) 31 enclosing the inner veto detector 20 and providing an active discrimination against neutron scatter events and gamma radiation. With a preferred example, two outer veto components 31, made of single crystal Ge or $CaWO_4$, are provided forming a box or hollow cylinder shaped container accommodating the inner veto detector 20 (see FIG. 4). The wall thickness of the outer veto detector 30 is e. g. 30 mm to 60 mm. Each outer veto component(s) 31 has an outer veto temperature sensor 33, which is provided on a surface of the respective outer veto component 31. Preferably, the outer veto temperature sensor 33 is structured like the target temperature sensor 12 described above, but adapted to the larger size of the outer veto component(s).

According to FIG. 2, the target detector 10 comprises an array 13 of multiple identical target crystals 11 each being provided as described with reference to FIG. 1. FIG. 2 is a schematic cross-sectional view. The complete array 13 comprises 3×3 target crystals 11 arranged in an array plane perpendicular to the drawing plane. The target crystals 11 are surrounded by the inner veto components 21A, 21B, 26A, 26B (shown in black) being held by passive support components 22 (hatched).

Each of the target crystals 11 is a calorimeter cube of e. g. 5×5×5 mm$^3$ with a TES (not shown) The inner veto components 21A, 21B, 26A, 26B are Si wafers instrumented with TESs (as described with reference to FIG. 1) and providing a 4π surface veto. Two of the inner veto components 21A, 21B (slabs parallel to the array plane) have first support elements 24, like pyramids or truncated pyramids, with a height of e. g. 200 μm, which preferably are produced by wet chemical etching of these inner veto components 21A, 21B. These first support elements 24 hold the target crystals 11 directly. One of the inner veto components (e. g. 21B) in direct contact with the target crystals is flexible due to a thickness of only 200 μm. The inner veto component 21B acts as a spring. Pressed to the target crystals 11, it realizes a spring-loaded holding structure which can compensate for thermal contraction of the various components of the inner veto detector 20. Possible events induced by the inner veto detector 20 (e.g. by thermal stress relaxation) can be rejected since they induce phonons in the TESs of the inner veto components 21A, 21B. The other one of the inner veto components (e. g. 21A) in direct contact with the target crystals is not flexible, and it has openings 27A for passing wire bonds. The remaining inner veto components 26A, 26B do not have direct contact with the target crystals 11, but are provided for completely surrounding the array 13.

The passive support components 22 are Si or sapphire wafers without temperature sensors, having a thickness of e. g. 2 mm. The inner veto components 21A, 21B, 26A being parallel to the array plane are supported via second support elements 25, e. g. sapphire balls with a diameter of e. g. 1 mm by the passive support components 22. The second support elements 25 can be adhesively connected to the respective passive support components 22, or they can be accommodated in receptacle holes having a smaller diameter than the second support elements 25. The passive support components 22 press together the inner part. The further inner veto components 26B being perpendicular to the array plane are arranged with a distance from the passive support components 22, closing the lateral sight lines from the target crystals 11 and allowing the pressing function thereof. To this end, the inner veto components 26B are supported by additional flexible holders (not shown). Openings 27B are provided in the passive support components 22 for passing wire bonds 18 of the target temperatures sensors (not shown). Furthermore, the passive support components 22 carry electrical wiring which is connected to the wire bonds 18.

The inner veto components 21A, 21B, 26A, 26B and the passive support components 22 are held together with mechanical connectors 28 (shown in FIG. 4), comprising e. g. screw rods, acting on the passive support components 22 only. The inner veto components 21A, 21B, 26A, 26B are indirectly held via the passive support components 22 by the mechanical connectors 28.

The array 13 of target detectors may comprise more target crystals 11 as schematically shown with the arrangement of 15×15 target crystals 11 each with a target temperature sensor 12 in FIG. 3. Preferably, all target crystals 11 have identical compositions, e. g. by manufacturing them from one common wafer. The target crystals 11 are held between the inner veto components 21A, 21B by first support elements (not shown) as described with reference to FIG. 2. The upper inner veto component 21A is illustrated with openings 27A (as shown in FIG. 2) for passing bonding wires.

FIG. 4 shows further details of an inventive neutrino detector device 100 with an array 13 of target detectors 10, the inner veto detector (partially shown) and the outer veto detector in an open condition. The array 13 of target detectors 10 comprises 3×3 target crystals as described above. Additionally, an array 43 of reference target detectors 40 is provided (schematically shown). The array 43 comprises 3×3 reference target crystals, each being provided like the target crystals with a TES (not shown), but comprising another material, e. g. sapphire, than the target crystals, e. g $CaWO_4$. Cubes of $CaWO_4$ (e. g. 0.76 g) and sapphire (e. g. 0.49 g) crystals are preferred because of their excellent cryogenic detector properties. The total mass of the sapphire array 43 is e. g. 4.41 g. The reference target crystals are arranged in a reference array plane parallel to the array plane of the target detectors 10. The two detector arrays 13, 43 and the inner veto detector 20 are installed inside the Ge or $CaWO_4$ outer veto detector with at least two cup-shaped outer veto components 31 with a diameter of e. g. 10 cm and a height of e. g. 5 cm, each being equipped with an outer veto temperature sensor and operated as a cryogenic detector.

With the target detectors 10 and the reference target detectors 40, a multi-target approach with a variety of sensitive crystals is provided which has a particular advantage for the separation of signal and background through characteristic interaction strengths. This advantage is further illustrated in FIG. 7 described below.

Figure 5:
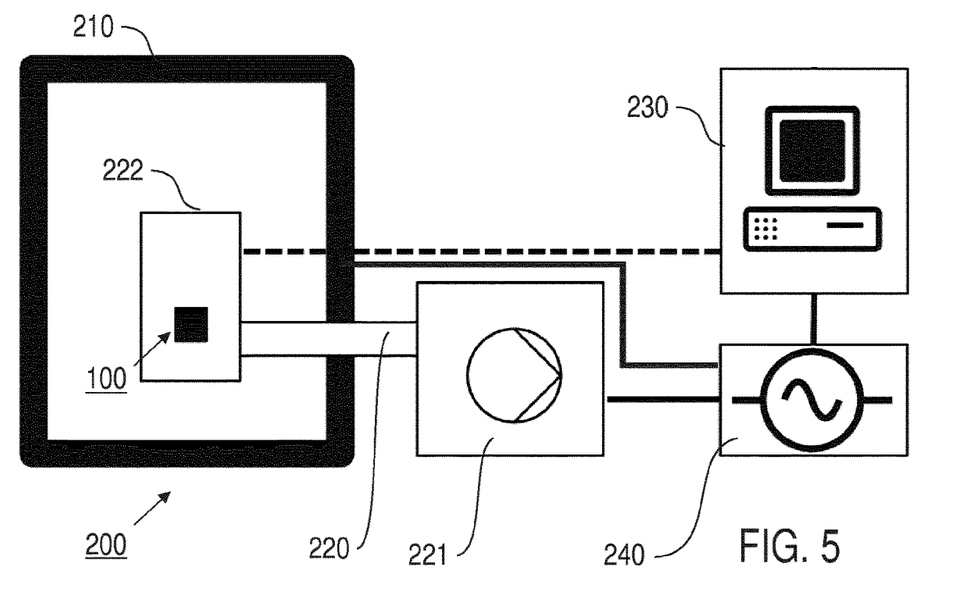
FIG. 5: a schematic view of a preferred embodiment of the inventive neutrino detector system.

A schematic view the inventive neutrino detector system 200 is schematically shown in FIG. 5. The neutrino detector system 200 comprises the inventive neutrino detector device 100, a cooling device 210, a vacuum device 220, a control device 230 and a generator device 240. The cooling device 210 is e. g. a dilution refrigerator cryostat, being capable of adjusting the temperature of the neutrino detector device 100 to e. g. 5 mK. The vacuum device 220 comprises a vacuum pump 221, like e. g. a turbomolecular pump, connected with a vacuum chamber 222, which is cooled by the cooling device 210. The neutrino detector device 100 is arranged in the vacuum chamber 222 at a vacuum pressure below $10^{-7}$ to $10^{-8}$ hPa. The generator device 240 is e. g. a diesel generator with an output power of e. g. 10 kW.

The control device 230 comprises a computer circuit which is arranged for receiving output signals from the temperature sensors of each detector 10, 20, 30. The output signals can be transmitted by wire or with a wireless communication. Each temperature sensor provides a separate output channel. With the array of target crystals 11 and the number of inner veto components 21A, 21B, 26A and outer veto components 31 (see FIGS. 1, 4), e. g. up to 20 output channels are connected with the control device 230. With further details, the control device 230 is arranged for storing time series of output signals of each output channel and subjecting the time series to a coincidence analysis. Signal events occurring exclusively in the output signals of the target temperature sensors are assigned to neutrino scatter events. The control device 230 is further arranged for controlling the components 210, 220 and 240.

Figure 6:
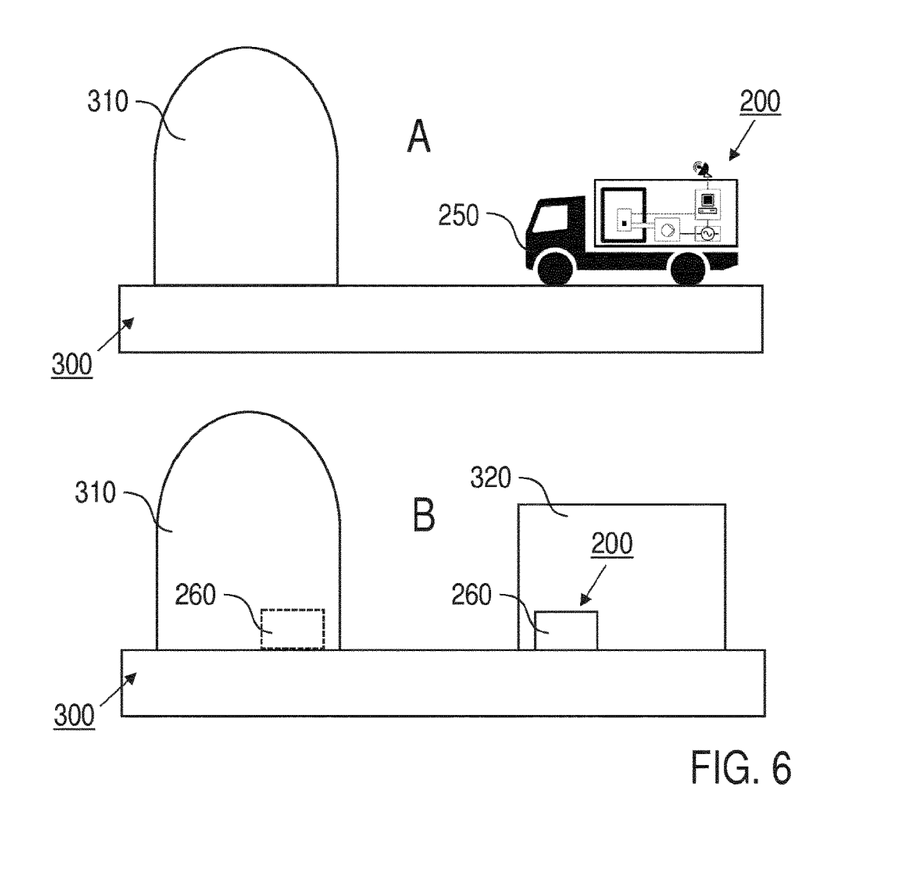
FIGS. 6A and 6B: schematic illustrations of arranging the neutrino detector system in an environment to be investigated.

FIG. 6 schematically illustrates the application of the invention for monitoring a nuclear power plant 310 (the reactor core is the target site to be monitored). One or more neutrino detector system(s) 200 is/are located on at least one mobile carrier device 250, which can be moved in the environment 300 of the nuclear power plant 310, e. g. in a range from 15 m to 100 m or more, e. g. up to 500 m from the reactor core (FIG. 6A), or in at least one stationary container 260, which is arranged in a building 320 and/or in the nuclear power plant 310 (FIG. 6B). Advantageously, the building 320 additionally shields against cosmogenic background. FIG. 6 shows the neutrino detector system 200 being operated above ground. Alternatively, the neutrino detector system 200 can be operated underground.

Neutrinos can be detected at the different detection positions by moving the mobile carrier device 250 and/or by using multiple stationary neutrino detector systems 200 at different locations (FIG. 6B). Due to the extremely low interaction of neutrinos with materials, the output signals of the detectors 10 to 30 at the different detection positions mainly will differ in terms of different background conditions and the known inverse square law dependency of the neutrino flux on the distance from the neutrino source. Accordingly, applying a coincidence analysis to the output signals at the different detection positions allows an additional background suppression.

Figure 7:
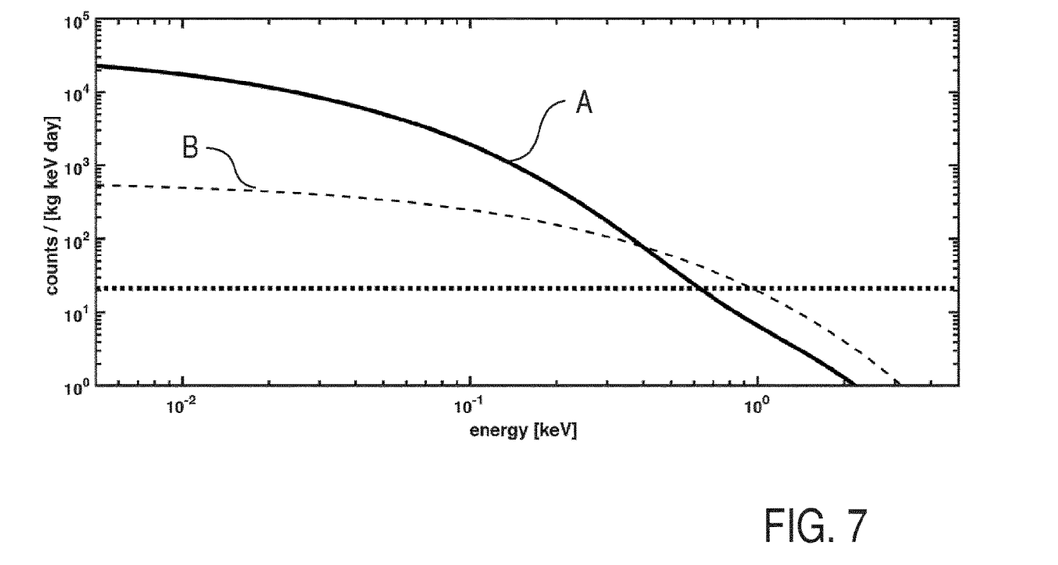
FIGS. 7 and 8: graphical illustrations of simulations results showing advantages of the invention.

FIG. 7 shows the examples of output signals of a neutrino detector device 100 including arrays 13, 43 of target detectors and reference target detectors as shown in FIG. 4. The neutrino scatter event count rates expected from a nuclear power plant of e. g. 4 GW are illustrated. The black dotted line indicates an example of background level from measurements and simulations. Curve A illustrates the count rates of the $CaWO_4$ based target detectors, while curve B illustrates the count rates of the $Al_2O_3$ based reference target detectors in dependency on neutrino recoil energy. Advantageously, in case of $CaWO_4$ the output signal at low neutrino recoil energies is 2 to 3 orders of magnitude above the background, whereas in case of $Al_2O_3$ the signal- to background ratio is much smaller (factor of 1-5). FIG. 7 shows that the strong material dependence of the count rate is a powerful tool for discriminating the neutrino signal from irreducible backgrounds. The signal rate is significantly different for $CaWO_4$ and $Al_2O_3$, e.g. at 10 eV the ratio is about 50:1. In contrast, the background counts from external gamma radiation is comparable (within a factor of about 2). Further, neutron background would yield similar spectra since in both materials—for neutron induced scatters—dominantly O scatters are above energy threshold due to kinematics.

Figure 8:
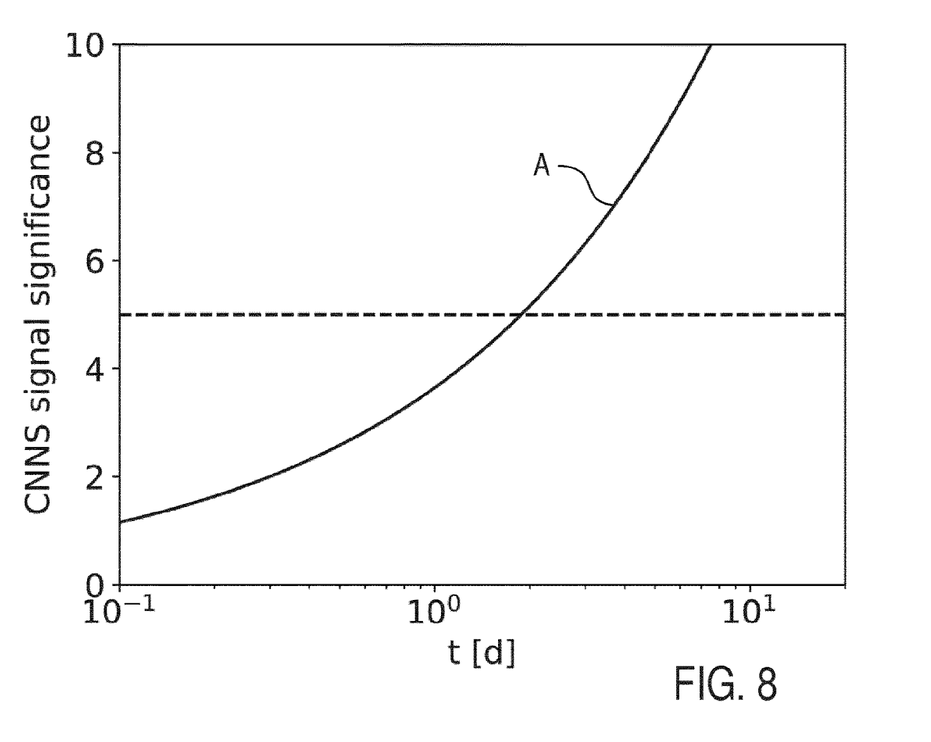

Curve A of FIG. 8 illustrates the significance of detecting neutrino scatter events (CNNS events) in dependency on measurement time with a neutrino detector device 100 of FIG. 4 having a sensitivity threshold of 10 eV, based on a likelihood analysis. This simulation results represents a measurement in a power plant 310 as shown in FIG. 6B. The dashed line illustrates the level of statistically significant detection of CNNS events used in scientific experiments. Advantageously, within about 2 days of detector operation significant neutrino detection can be obtained. This represents a substantial progress compared with conventional detection techniques, taking in consideration that a detector with a total mass of about 10 g is used. In particular, FIG. 8 illustrates the potential of the invention for a reliable detection of neutrinos within short measuring times.

The features of the invention disclosed in the above description, the drawings and the claims can be of significance individually, in combination or sub-combination for the implementation of the invention in its different embodiments.

The invention claimed is:

1. Neutrino detector device, being configured for detecting neutrinos, comprising:
   at least one target detector including a target crystal, which is adapted for creating phonons in response to an interaction of neutrinos to be detected with the target crystal, and a target temperature sensor, which is arranged for sensing a temperature change in response to an absorption of phonons created in the target crystal; and
   an inner veto detector including at least one inner veto component with an inner veto temperature sensor, wherein the at least one inner veto component is adapted for supporting the at least one target detector and for an anticoincidence based discrimination of background interaction events by creating phonons in response to the background interaction events and sensing a temperature change in response to an absorption of the phonons with the inner veto temperature sensor, wherein
   the neutrino detector device is configured for an operation at cryogenic temperatures,
   a crystal volume of the target crystal and a size of the target temperature sensor of the at least one target detector are selected such that an over-ground sensitivity threshold of the at least one target detector is below 180 eV,
   the at least one inner veto component surrounds the at least one target detector, so that the at least one target detector is arranged within the inner veto detector, and
   an outer veto detector is provided for accommodating the inner veto detector, wherein the outer veto detector comprises at least one outer veto component being adapted for creating phonons in response to an interaction with background radiation and having an outer veto temperature sensor, which is arranged for sensing a temperature change in response to an absorption of phonons created in the at least one outer veto component.

2. Neutrino detector device according to claim 1, wherein the crystal volume of the target crystal and the size of the target temperature sensor of the at least one target detector are selected such that the over-ground sensitivity threshold of the at least one target detector is below 100 eV.

3. Neutrino detector device according to claim 1, wherein the target crystal of the at least one target detector has a cube shape.

4. Neutrino detector device according to claim 3, wherein the target crystal has an edge length below 10 mm.

5. Neutrino detector device according to claim 1, wherein the target temperature sensor of the at least one target detector is a transition edge sensor.

6. Neutrino detector device according to claim 1, wherein an array of multiple target detectors is provided within the inner veto detector.

7. Neutrino detector device according to claim 6, wherein the target crystals of the target detectors are made from a common wafer component.

8. Neutrino detector device according to claim 1, further including
   at least one reference target detector being arranged within the inner veto detector and including a reference target crystal, which is adapted for creating phonons in response to the background interaction events, and a reference target temperature sensor, which is arranged for sensing a temperature change in response to an absorption of phonons created in the reference target crystal.

9. Neutrino detector device according to claim 8, wherein both of the target crystal and the reference target crystal include light nuclei.

10. Neutrino detector device according to claim 8, wherein
an array of multiple reference target detectors is provided within the inner veto detector.

11. Neutrino detector device according to claim 1, wherein
the at least one inner veto component of the inner veto detector surrounds the at least one target detector along all spatial directions.

12. Neutrino detector device according to claim 1, wherein
the at least one inner veto component of the inner veto detector comprises a single crystal wafer.

13. Neutrino detector device according to claim 12, wherein
the at least one inner veto component of the inner veto detector has a thickness in a range from 10 µm to 1 mm.

14. Neutrino detector device according to claim 1, wherein
the at least one inner veto component of the inner veto detector comprises a silicon or sapphire wafer.

15. Neutrino detector device according to claim 14, wherein
the at least one inner veto component of the inner veto detector has a thickness in a range from 10 µm to 1 mm.

16. Neutrino detector device according to claim 1, wherein
at least two inner veto components of the inner veto detector are arranged on opposite sides of the at least one target detector, wherein the inner veto components have first support elements clamping the at least one target detector therebetween.

17. Neutrino detector device according to claim 16, wherein the first and second support elements provide contact surfaces being sized such that at least one of
thermal coupling between the target crystal of the at least one target detector and the inner veto components is negligible compared with thermal coupling from the target crystal via the target temperature sensor to the surrounding heat bath, and
thermal coupling between the at least one inner veto component of the inner veto detector and the passive support components is negligible compared with thermal coupling from the at least one inner veto component via the inner veto temperature sensor to the surrounding heat bath.

18. Neutrino detector device according to claim 17, wherein
the first and second support elements provide point-like contact surfaces.

19. Neutrino detector device according to claim 1, wherein
the inner veto detector includes at least one passive support component being adapted for supporting the at least one inner veto component via second support elements.

20. Neutrino detector device according to claim 19, wherein the first and second support elements provide contact surfaces being sized such that at least one of
thermal coupling between the target crystal of the at least one target detector (10) and the inner veto components is negligible compared with thermal coupling from the target crystal via the target temperature sensor to the surrounding heat bath, and
thermal coupling between the at least one inner veto component of the inner veto detector and the passive support components is negligible compared with thermal coupling from the at least one inner veto component via the inner veto temperature sensor to the surrounding heat bath.

21. Neutrino detector device according to claim 20, wherein
the first and second support elements provide point-like contact surfaces.

22. Neutrino detector device according to claim 1, wherein
the at least one outer veto component of the outer veto detector is made of single crystal material.

23. Neutrino detector device according to claim 1, wherein
the outer veto detector comprises at least two outer veto components forming a container, which surrounds the inner veto detector.

24. Neutrino detector device according to claim 1, wherein
the target crystal of the at least one target detector is adapted for creating photons in response to background interaction events in the target crystal, and
the inner veto detector is adapted for detecting the photons.

25. Neutrino detector system, comprising:
at least one neutrino detector device according to claim 1,
a cooling device being arranged for cooling the at least one neutrino detector device,
a vacuum device being arranged for evacuating the at least one neutrino detector device, and
a control device being coupled with the target temperature sensor of the at least one target detector, the at least one inner veto temperature sensor of the inner veto detector and the at least one outer veto temperature sensor of the outer veto detector.

26. Neutrino detector system according to claim 25, further including
a generator device being arranged for power supply and operating the neutrino detector system independently of a stationary power network.

27. Neutrino detector system according to claim 25, being included on a mobile carrier device or in a stationary container.

28. Method of detecting neutrinos, comprising:
providing the neutrino detector device according to claim 1 in an environment to be investigated,
collecting sensor signals of the target temperature sensor of the at least one target detector, the at least one inner veto temperature sensor of the inner veto detector and the at least one outer veto temperature sensor of the outer veto detector as a function of time, and
analysing the collected sensor signals for identifying neutrino scatter events in the at least one target detector.

29. Method according to claim 28, wherein
the neutrino detector device is operated above ground.

30. Method according to claim 28, wherein
the environment to be investigated includes a nuclear power station.

31. Method according to claim 28, including
providing the neutrino detector device at at least two different detection positions having different distances from a target site in the environment to be investigated,
collecting the sensor signals at the different detection positions, and
analysing the collected sensor signals, wherein background conditions are characterized by differences of the collected sensor signals at the different detection positions.

* * * * *